Patented Aug. 8, 1939

2,168,593

UNITED STATES PATENT OFFICE 2,168,593

METHOD OF MAKING ARTIFICIALLY COLORED GRANULES

Marion H. Veazey, Rutherford, N. J., assignor to The Patent and Licensing Corporation, New York, N. Y., a corporation of Massachusetts No Drawing. Original application July 31, 1934, Serial No. 737,774. Divided and this application February 23, 1938, Serial No. 191,965

2 Claims. (Cl. 91—70)

This application is a division of my copending application Serial No. 737,774, filed July 31, 1934, now Patent No. 2,142,540.

This invention relates to improvements in the production of artificially colored granules and more particularly to the production of mineral granules artificially colored, to be used as a surfacing for materials subject to exposure out of doors.

In its more specific aspect the invention is concerned with the production of artificially colored granules adapted for use as a surfacing for sheet material widely used as roofing, siding and for similar purposes in building construction.

In the production of prepared roofing and siding the base material which is usually a sheet of fibrous felt, is saturated and coated with asphaltic material. The asphaltic coating layer is provided with a wearing surface of mineral granules such as crushed slate, slag or the like, this layer of mineral granules serving as a wearing surface and also as a decorative finish for the material.

In more recent years various methods have been suggested for the production or imposition of artificial colors on the surfaces of the granules where the base granules are not of the desired colors, for the purpose of making it possible largely to extend the range of colors or shades obtainable, where otherwise the range is limited by the natural color of the granules.

The more practical and economical processes of producing so-called artificially colored granules depend upon the imposition or affixing of pigments of desired colors to the surfaces of the granules by means of soluble silicate, and more particularly sodium silicate. The sodium silicate in these processes serves as a fixing agent for binding the pigment to the granules, the soluble form of the silicate being transformed in the coloring process into an insoluble state. The conversion of the soluble silicate into an insoluble form can be accomplished in several ways, principally two in number, and depending largely upon the character of the base granules that are being colored. In one of these methods which has been commercially practiced the conversion takes place under the influence of heat treatment at temperatures within the range of roasting temperatures varying from 900 to 1500° F. In such an operation the insolubilization of the sodium silicate may be considered to result purely from the heat treatment. In the other of the aforementioned methods the insolubilization of the sodium silicate is accomplished by chemical action rather than by a heat treatment. The insolubilization by chemical action affords considerable advantage over the first mentioned method. One such advantage resides in the lower fuel costs in carrying on the coloring operation and another advantage resides in the ability to utilize certain pigments which cannot readily be employed in the first mentioned method because of the deleterious effect that the roasting temperatures have upon such pigments. The chemical method of insolubilizing the soluble silicate employed in these processes has in commercial practice been utilized in conjunction with granules which are of a reactive character with respect to the sodium silicate. Basic slag granules and other granules containing calcareous or siliceous constituents which, under the conditions of operation are more or less reactive towards the soluble silicate, have been utilized in this way, making it possible to produce artificially colored granules in which the soluble silicate becomes insolubilized at relatively low temperatures, say below 600° F., in a commercially feasible manner. Such low temperature operations have also been carried on in the coloring of granules which are not in themselves reactive towards the soluble silicate as is the case with basic slag granules, by incorporating in the mixture of sodium silicate and pigment with which the granules are coated, another reagent which, under the conditions of operation, will cause or hasten the insolubilization of the silicate.

In the practice of either of the methods thus generally described, the base granules are introduced into a mixer with the requisite quantities of the sodium silicate and pigment and/or other agents that may be incorporated, the mixer being continued in operation until the surfaces of the granules become completely and uniformly coated with the coloring mixture whereupon the coated granules are passed through a rotary kiln in order to effect the drying and insolubilization of the coating and the fixing of the color upon the surfaces of the granules. While the practice of the methods to which I have alluded results, when properly conducted, in the substantially complete insolubilizaton of the soluble silicate to the point that the pigment is firmly fixed and bound to the granules, the granules colored by these processes, especially when conducted at the relatively lower temperatures, have a tendency to "bloom". This "blooming" manifests itself in the form of a white or opaque and more or less bulky deposit when the finished granules are moistened with water and the moisture subsequently evaporated. Thus, when granules colored by the processes described are applied as a surfacing layer for prepared roofing, and the roofing is exposed to the weather, particularly at temperatures around 55° F. or less, there appears, when the rain or moisture evaporates, a white powder on the surface of the granules. This powder or white coloration is soluble in water and is washed off the surface by rain and therefore is not in any sense a true or permanent discoloration, but it nevertheless renders the material colored with such granules objectionable to the user and difficultly saleable. As a matter of fact, the appearance of the white powder to which I have here given the designation "blooming" frequently occurs in shingles surfaced with such granules while the shingles are still in the bundle in which they are shipped from the factory and before the shingles are applied to the roof or side wall, if the conditions under which the bundle has been shipped or stored have been such as to allow substantial moisture or rain to contact with the granules.

This "blooming" effect, i. e. the appearance of a deposit of white powder on the surface of the material after it has been exposed to moisture and the moisture has subsequently evaporated is, as already stated, only a temporary condition. That is to say, the whitish powder that appears is eventually washed off on continued exposure to rain, but it reappears with gradually diminishing intensity and finally becomes practically undiscernible. Nevertheless the appearance of the whitish powder on the surface of shingles covered with the granules colored by these processes, whether during shipment of the shingles or during the early stages after exposure, militates against the saleability of the products.

The principal object of my invention is to provide an improved method of artificially coloring granules wherein use is made of soluble silicate such as sodium silicate as the binding or fixing agent for the coloring pigment but in which the tendency of the granules to "bloom" is prevented or reduced to such a minimum degree as to make the effect unobjectionable under ordinary conditions of use.

In approaching this problem of preventing the "blooming" effect described, I have conducted extensive experiments in order to ascertain the cause and the mechanism of the "blooming" effect and as a result thereof I have devised means for preventing or minimizing this effect, which I shall hereinafter describe in greater detail.

From the experiments which I have conducted it appears quite conclusively that the "blooming" effect is due primarily to the leaching out of sodium carbonate from the film of the coating material deposited on the surfaces of the granules. When the sodium carbonate is thus leached out the subsequent evaporation of water or moisture results in the carbonate crystallizing out as a hydrated carbonate, namely, the decahydrate, $Na_2CO_3:10H_2O$. This hydrated form of the carbonate crystallizes out particularly at temperatures of around 55° F. or less. The foregoing accounts for the fact that the "blooming" effect is more easily noticeable during the cold season of the year than during the warmer season, or in warmer climates.

The decahydrate form of the sodium carbonate is ordinarily an efflorescent salt and as a result, it gives up most of its water of crystallization on continued exposure to air which allows the monohydrated sodium carbonate to remain as an opaque, very bulky deposit. The amount of decahydrate salt that crystallizes depends not only upon the amount of sodium carbonate leached out of the film but upon the temperature prevailing during crystallization; the greater the amount of the decahydrate that is formed, the bulkier will be the deposit of the monohydrate when the decahydrate subsequently undergoes its efflorescence.

In addition to the sodium carbonate present in the coloring film on the surface of the granules, there is also present in the film certain amounts of sodium hydroxide which, when it is leached out on contact with moisture, slowly reacts with carbon dioxide of the air, forming sodium carbonate, and the sodium carbonate thus formed appears also to be a contributing factor to the "blooming" effect described. Inasmuch as the sodium hydroxide must be converted to carbonate in order for it to participate in the formation of bloom and in view of the fact that sodium hydroxide is highly soluble in water, its influence will be largely a matter of conditions prevailing during the first stages of exposure. Thus if dry weather prevails for a long time considerable conversion to carbonate may take place. On the other hand if subjected to the action of rain, it appears that sodium hydroxide may be largely removed before being converted to carbonate. Thus its influence is secondary and more or less casual—the major effect being due to the presence of carbonate already formed when the granules are exposed to the conditions of temperature and moisture referred to above. The "blooming" effect in granules as ordinarily produced, therefore, is not due to the mere presence of soluble materials in the colored film but appears quite definitely to be dependent upon the crystal form that the soluble materials (sodium carbonate) present in the film take when they are leached out of the film and the water or moisture subsequently evaporates, and upon the chemical property of efflorescence possessed by the crystals.

The white deposit which I have termed "blooming" that is thus formed on the surfaces of the granules being soluble in water and washed off by rain, nevertheless tends to reappear but is finally exhausted. The "blooming" therefore may recur over a considerable period of time.

The sodium carbonate that is present in the film apparently results from the reaction between the hydroxide present in the silicate solution used in the coloring process, and carbon dioxide present in the flue gases with which the granules are dried and brought to the stage of insolubilized silicate. The amount of the "blooming" is shown by the tests which I have conducted to be directly related to the quantity of sodium carbonate and hydroxide which can be extracted in the cold from the surfaces of the granules. To distinguish between granules which will be subject to a heavy "blooming" and those which will show only a slight "blooming", samples of the granules need only be thoroughly wetted with water and then dried rapidly at low temperatures. Specifically, the test is carried out as follows:

50 grams of granules are placed in a standard Petrie dish of about 10 cms. diameter and 1 cm. depth, covered with approximately 25 to 35 ccs. of distilled water and allowed to stand at room temperatures for 48 hours. In case of excessive evaporation more water is added so that the granules are at all times soaking. At the expiration of 48 hours the dish is placed in a chamber in which the air is kept circulating by a small fan and maintained at a temperature of 40 to 50° F. until the granules are dry.

Those on which the white deposit is heavy indicate that the granules on exposure will suffer heavy "blooming" while the samples on which the white deposit is small or unobservable will show practically no "blooming" on exposure. This qualitative test may be related quantitatively by determining the amount of sodium carbonate that can be extracted in the cold from the granules. It may be stated, generally, that if the amount of sodium carbonate which is extractable in forty-eight hours from a 50 gram sample by cold water exceeds 0.020 gram and the amount of sodium hydroxide thus extractable exceeds 0.030 gram, considerable "blooming" will result. On the other hand when the amount of cold extractable sodium carbonate and sodium hydroxide is below the figures mentioned, respectively, the "blooming" will be slight or negligible.

Although washing of the granules after they have been completely processed by the so-called silicate process in order to remove all soluble material from the film would prevent "blooming", such an expedient would necessitate the installation of costly equipment as well as expense in the operation thereof.

I have found that when the granules coated with the desired mixture of pigment and soluble silicate have been subjected in the usual direct fired kiln or retort to the elevated temperature necessary for effecting insolubilization of the sodium silicate, the tendency of the processed granules to exhibit any substantial bloom can be eliminated by suitable after-treatment of the thus processed granules, as hereinafter more fully described.

In an ordinary operation illustrating my invention for the production of green granules from a trap rock base, the following proportions are illustrative:

| | Parts |
|---|---|
| Trap rock granules | 100 |
| Sodium silicate | 6 |
| Chromium oxide | 1 |

The chromium oxide may be first suspended in the silicate and the pigment-silicate suspension may then be mixed with the granules in any suitable form of mixer or the granules and other ingredients may be separately introduced into the mixer, and the mixer continued in operation until the granules become completely and uniformly coated with the pigment-silicate suspension. The thus coated granules may then be passed through a rotary kiln or retort of an ordinary direct fired type and brought to the necessary temperature, say 500 to 600° F., for effecting insolubilization of the silicate and permanent fixation of the color deposit on the surfaces of the granules. After the granules have thus been retorted and preferably before they have cooled, they are subjected to treatment with substances which neutralize substantially all the sodium carbonate present in the film as a result of any reaction between sodium hydroxide and carbon dioxide of the combustion gases in the kiln. The amount of sodium carbonate present on granules exhibiting a moderate to heavy bloom on exposure generally approximates 0.1 to 0.3% by weight of the granules. Such granules may therefore be treated with at least the metathetical proportions of the neutralizing agent necessary to neutralize the carbonate present. Larger quantities sufficient additionally to neutralize the sodium hydroxide can be advantageously employed. The neutralizing agent must be selected from among those which do not produce water soluble bloom-forming efflorescent salts or for some other reason deposit whitish films.

These neutralizing agents are preferably used by spraying the granules with a water solution thereof as the granules pass from the lower end of the retorting kiln and pass into the cooling tower through which the granules are usually passed in order to cool them down to the temperature requisite for further handling. When the reagent is used in this way it is necessary to spray the liquid so that it makes the most efficient contact with each granule. The strength of the solution should be adjusted with relation to the carbonate content of granules and the amount of aqueous solution sprayed upon the granules should be adjusted in relation to the temperature of the granules leaving the kiln. In this way the spraying may be carried out under such conditions that all of the water is evaporated by the heat of the granules, thereby eliminating the necessity for a separate drying step. In carrying out this procedure, granules leaving the kiln at approximately 600° F. may be sprayed with a 5 to 8% citric acid solution at a temperature of approximately 160° F. at such a rate that approximately 2 to 8 pounds of citric acid are used per ton of granules. In lieu of citric acid, tartaric, and similar acids which do not attack the pigment and do not form water soluble bloom-forming efflorescent salts may be employed. While all of these acids appear to be effective for preventing blooming when the finished granules are treated therewith in the manner stated, it may be that in certain instances the effect of the acid is due to something other than or in addition to neutralization of the carbonate and/or hydroxide present in the films, as for example, a tendency to inhibit the formation of bloom-forming salt.

It is possible to treat the granules cold or at a reasonably elevated temperature with an aqueous solution of certain acids including those above mentioned in which case it is not necessary to separately wash the treated granules to remove the reaction products of the neutralization as would be the case if acids such as sulphuric were employed.

Where the temperature of the granules has been reduced to atmospheric or to temperatures substantially below the retorting temperatures, certain additional types of acids which are more or less volatile may be employed in lieu of or in addition to those above mentioned. For example, to one ton of granules which have been reduced to a temperature of 250° F. and containing about 0.1% of sodium carbonate there may be added one gallon of water containing about 3½ pounds of formic, or a corresponding amount of acetic or nitric acid. The acid may be added without water, but the inclusion of water assists in the distribution of the acid and is advantageous so long as the quantity is kept below the amount which would cause the granules to become appreciably wet, i. e. wet enough to interfere with their effective application as a surfacing layer for asphalt coated roofing.

In certain instances it may be desirable to utilize the above described after-treatment of the granules with any of the treating substances mentioned, as an after-treatment for granules produced by one or more of the several expedients described in my co-pending application Serial No. 737,774 now Patent No. 2,142,540, such as treating with a spray of a water solution of boric acid or tartaric acid. Thus, under certain conditions it may be advantageous to incorporate into the mix of soluble silicate and pigment with which the granules are to be coated, an inhibiting reagent of the character described in the aforementioned application and thereupon to retort the granules in the usual way to effect complete insolubilization of the sodium silicate, followed by the after-treatment with the agents hereinabove mentioned. Likewise, it may be advantageous in certain instances to subject granules which have been predried in an atmosphere substantially free of carbon dioxide and then retorted in the usual way in a direct fired kiln, as also described in the aforementioned application, to an after-treatment with a spray of a water solution of a suitably selected one of the reagents hereinabove mentioned.

It will be observed that the treating agents herein mentioned produce, by their reaction with sodium carbonate and/or sodium hydroxide contained in the coated film on the granules, reaction products none of which are crystallized out of water as salts of a bloom-forming character. After-treatment with reagents of that character makes it possible therefore to avoid the necessity of washing the granules to remove products of the neutralizing reaction therefrom as would be the case if acids such as sulphuric acid were employed resulting in the production of sodium sulphate as one product of the neutralizing reaction which is itself of a bloom-forming character. Thus by the selection of the reagents as above described, it is unnecessary to separately wash the treated granules to remove the reaction products of the neutralization and when these reagents are used in the form of a solution whose aqueous content is adjusted as above described so as to be completely evaporated by the heat of the retorted granules, there is also avoided the necessity for employing a subsequent separate step of drying the granules after neutralization has been effected.

What I claim is:

1. The method of artificially coloring mineral granules which comprises coating the granules with pigment and sodium silicate, retorting the granules at temperatures sufficient to insolubilize the silicate and then neutralizing any sodium carbonate formed in the coating during the retorting of the granules by subjecting the retorted granules while still at an elevated temperature to treatment with an aqueous solution of an acidic substance selected from the group consisting of citric, tartaric, formic, acetic and boric acids, said solution being applied to the granules in amounts to enable the aqueous content to be evaporated by the heat of the granules.

2. The process as in claim 1, wherein the acid is employed in quantities sufficient to neutralize also the sodium hydroxide present in the coating.

MARION H. VEAZEY.